United States Patent
Gao et al.

(10) Patent No.: US 8,054,801 B2
(45) Date of Patent: Nov. 8, 2011

(54) METHOD AND SYSTEM FOR IMPLEMENTING INTER-ACCESS NETWORK HANDOFF IN ACTIVE STATE IN HRPD NETWORK

(75) Inventors: Quanzhong Gao, Shenzhen (CN); Qingrong He, Shenzhen (CN); Zhiming Li, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 994 days.

(21) Appl. No.: 11/941,283

(22) Filed: Nov. 16, 2007

(65) Prior Publication Data

US 2008/0062955 A1    Mar. 13, 2008

Related U.S. Application Data

(63) Continuation of application No. PCT/CN2006/000989, filed on May 16, 2006.

(30) Foreign Application Priority Data

May 16, 2005   (CN) .......................... 2005 1 0072595
May 19, 2005   (CN) .......................... 2005 1 0070971
Jun. 14, 2005   (CN) .......................... 2005 1 0077113

(51) Int. Cl.
*H04W 4/00* (2009.01)
*H04W 36/00* (2009.01)

(52) U.S. Cl. ........ 370/331; 370/332; 455/436; 455/438; 455/439

(58) Field of Classification Search .................. 370/348, 370/331, 332; 455/436, 438, 439
See application file for complete search history.

(56) References Cited

U.S. PATENT DOCUMENTS

| | | | |
|---|---|---|---|
| 6,577,868 B1 * | 6/2003 | Vialen et al. | |
| 6,834,190 B1 | 12/2004 | Lee et al. | |
| 2002/0021681 A1 | 2/2002 | Madour | |

(Continued)

FOREIGN PATENT DOCUMENTS

CN    1286580 A  *  3/2001

(Continued)

OTHER PUBLICATIONS

First Chinese Office Action Appln. No. 200510077113.2.*

(Continued)

*Primary Examiner* — Marsha D Banks Harold
*Assistant Examiner* — Saad Hassan
(74) *Attorney, Agent, or Firm* — Slater & Matsil, L.L.P.

(57) ABSTRACT

A method and system for implementing an inter-Access Network (AN) handoff in an active state in a High Rate Packet Data (HRPD) Network. The method mainly includes determining that an inter-AN handoff operation is necessary and initiating a handoff procedure to perform the inter-AN handoff, sending data to be transmitted to an access terminal to the destination AN in advance in the handoff procedure, and then sending the access terminal the data to be transmitted to the access terminal by the source AN or the destination AN according to the result of the handoff procedure. With the method according to the present invention, the continuity of a service may be improved. Even if the inter-AN handoff procedure fails, the source PCF may send data information obtained upon the start of the handoff to the access terminal when the access terminal returns to the source AN since the source PCF may receive data from the PDSN throughout the handoff procedure. As a result, the continuity of a service may be improved.

2 Claims, 3 Drawing Sheets

U.S. PATENT DOCUMENTS

| | | | |
|---|---|---|---|
| 2004/0078634 A1 | 4/2004 | Seo | |
| 2004/0121774 A1* | 6/2004 | Rajkotia et al. | 455/441 |
| 2005/0073990 A1* | 4/2005 | Chang et al. | 370/349 |
| 2005/0094599 A1* | 5/2005 | Ryu et al. | 370/331 |
| 2005/0197122 A1* | 9/2005 | Sliva | 455/436 |
| 2005/0237977 A1* | 10/2005 | Sayeedi | 370/331 |
| 2006/0023668 A1* | 2/2006 | Ramaswamy et al. | 370/335 |
| 2006/0062180 A1* | 3/2006 | Sayeedi et al. | 370/328 |
| 2006/0072506 A1* | 4/2006 | Sayeedi et al. | 370/331 |

FOREIGN PATENT DOCUMENTS

| | | |
|---|---|---|
| CN | 1305328 A * | 7/2001 |
| CN | 1342005 | 3/2002 |
| CN | 1342005 A * | 3/2002 |
| CN | 1446009 A * | 10/2003 |
| CN | 1571322 | 1/2005 |
| CN | 1574793 A * | 2/2005 |
| JP | 2001-103534 A * | 4/2001 |
| JP | 2005-012718 A * | 1/2005 |
| WO | 02/33999 A1 * | 4/2002 |

OTHER PUBLICATIONS

First Chinese Office Action Appln. No. 200680012322.1.*
First Japanese Office Action Appln. No. 2008-511535.*
English Translation Written Opinion of The International Searching Authority.*
"Interoperability Specification (IOS) for cdma2000 Access Network Interfaces—Part 3 Features (3G-IOS v5.0)", 3GPPS A.S0013-C Version 1.0 Feb. 2005, 3$^{rd}$ Generation Partnership Project 2 "3GPP2", 374 pages.*
"cdma2000 High Rate Packet Data Air Interface Specification", 3GPP2 C.S0024 Version 4.0, Oct. 25, 2002, 3$^{rd}$ Generation Partnership Project 2 "3GPP2", 548 pages.*
Interoperability Specification (IOS) for High Rate Packet Data (HRPD) Access.*
Network Interfaces, Revision 0 (Post SDO Ballot, Pre-SDO Publication Version), 3GPP2 A.S0008-0 v3.0 May 2003, 3$^{rd}$ Generation Partnership Project 2 "3GPP2", 128 pages, A.S0008-0 (TIA-898-1) IOS HRPD Publication Version.
"cdma2000 Wireless IP Network Standard", 3GPP2 P.S0001-B Version 2.0, Sep. 2004, 3$^{rd}$ Generation Partnership Project 2 "3GPP2", 111 pages.
3$^{rd}$ Generation Partnership Project 2, 3GPP2, "cdma2000 Wireless IP Network Standard," 3GPP2.P.S0001-B, Version 2.0, Sep. 2004, 111 pages.
Decision of Refusal, Japanese Patent Office, Patent application 2008-511535, Drafting date: Nov. 15, 2010, 4 pages.

* cited by examiner

METHOD AND SYSTEM FOR IMPLEMENTING INTER-ACCESS NETWORK HANDOFF IN ACTIVE STATE IN HRPD NETWORK

CROSS-REFERENCE TO RELATED APPLICATIONS

The present application is a continuation application to PCT application No. PCT/CN2006/000989, filed May 16, 2006, which claims priorities of Chinese application No. 200510072595.2, filed May 16, 2005, Chinese application No. 200510070971.4, filed May 19, 2005, and Chinese application No. 200510077113.2, filed Jun. 14, 2005.

FIELD OF THE INVENTION

The present invention relates to the field of communications, and in particular, to a method and system for implementing an inter-Access Network (AN) handoff in an active state in a High Rate Packet Data (HRPD) network.

BACKGROUND OF THE INVENTION

With the development of communication technologies, the 3$^{rd}$ Generation Partnership Project 2 (3GPP2) proposed a standard for HRPD technology in order to solve the crucial issue on air interfaces in a Code Division Multiple Access (CDMA) system. This standard aims to improve the data transmission rate on a wireless interface. Compared with the data rate of 153.6 kbit/s provided by CDMA 2000 1x, the HRPD technology may provide a forward data rate up to 2.4 Mbit/s.

In an HRPD network, a new modulation technique is utilized over air interface and methods for data rate control, scheduling optimization and time division multiplex and the like are added, which cause a significant improvement in data transmission rate over air interface. In the HRPD technology, a private data channel on a CDMA carrier (1.25 MHz) may be employed to support high rate packet data services, with a forward data rate up to 2.4576 Mbit/s, and a peak data rate of 153.6 kbit/s for a single user supported in reverse direction.

A separate carrier is needed to support HRPD when deploying an HRPD network. In this manner, when moving in the HRPD network, an access terminal may move from one AN into another AN in the HRPD network. At this time, a handoff from a source NA to a destination NA is necessary.

Currently, the 3GPP2 standard supports only the inter-AN handoff in dormant state. This handoff process is as follows: when an access terminal performing a data service in an HRPD network moves to an edge of the coverage zone of a cell, it is necessary to be handed off to another AN so as to continue its data service. At this time, the system switches the packet data service from an active state to a dormant state at the source AN, and then hands off to the destination AN in the dormant state. After moving into the destination AN, the system switches the packet data service from the dormant state back to the active state at the destination AN.

With the above handoff process, a handoff operation from a source AN to a destination AN may be implemented. However, for a data service with high real-time requirement, such as Voice over IP (VoIP), Video Phone, Push-To-Talk (PTT) and stream media, such a handoff process may cause an interruption of the service, which will result in an adverse effect to the utilization of the service for the user.

In other words, in the method of inter-AN, inter-Packet Control Function (PCF) handoff in dormant state provided in the prior art standard, it is necessary to release the Point-to-Point Protocol (PPP) connection being in use during a handoff process, and thus it is necessary for the Packet Data Service Network (PDSN) to reallocate a new PPP connection for the destination network. During the reallocation of the new PPP connection, for one thing, the service of the user may be interrupted due to the failure of the reallocation process resulted from problems of the resources; for another, the current service of the user may be delayed significantly because it will cost the PDSN some time to reestablish a PPP connection.

In view of this, a hard handoff process is required to ensure the continuity of a service during an inter-AN handoff process. However, in the prior art standard, only an inter-AN handoff process in dormant state is defined, and there is a lack of an inter-AN, inter-PCF hard handoff process in an active state in an HRPD system.

SUMMARY OF THE INVENTION

In view of the above, the present invention is to provide a method and system for implementing an inter-AN handoff in an active state in an HRPD network, to ensure the continuity of a service for an access terminal during a handoff process across ANs, across PCFs.

Based on this, the present invention provides a method to ensure the returnablity in the case of a failure of a handoff, so as to improve the reliability of the service communication.

The present invention provides the following technical solutions.

A method for implementing an inter-AN handoff in an active state in an HRPD network is provided, which includes the following steps.

A. It is determined that an inter-AN handoff operation is necessary, and a handoff procedure is initiated.

B. In the inter-AN handoff procedure, a connection between a destination AN and a PDSN is established before an access terminal establishes a connection with the destination AN, and user data is sent by the PDSN to the destination AN/PCF.

C. When the access terminal establishes a connection with the destination AN, the data received from the PDSN is sent from the destination AN/PCF to the access terminal.

Here, step A includes the following steps.

A1. A source AN determines that an inter-AN handoff operation is necessary according to a received route update message, and determines the destination AN corresponding to the source AN.

A2. The source AN sends a handoff request message to the destination AN.

Here, when a handoff is performed between Access Networks belonging to different PCFs, step B includes the following steps.

B1. In response to receiving the handoff request sent from the source AN, the destination AN sends a connection establish request to the destination PCF, and establishes a connection between the destination PCF and the destination AN; the destination PCF registers to the PDSN, and establishes a connection between the destination PCF and the PDSN.

B2. When a source PCF requests to stop sending data, the PDSN sends data to the destination PCF and stops sending data to the source PCF.

Here, step B2 includes the following steps.

B21. When disconnecting of an air interface connection between the source AN and the access terminal is determined, the source PCF sends a stop-sending-data request to the PDSN requesting the PDSN to stop sending data the source PCF.

B22. When receiving the stop-sending-data request sent from the source PCF, the PDSN starts sending data to the destination PCF if the PDSN has not sent data to the destination PCF, while stopping sending data to the source PCF.

Here, when a handoff is performed between Access Networks belonging to different PCFs, step B includes the following steps.

B1'. In response to receiving the handoff request sent from the source AN, the destination AN sends a connection establish request to the destination PCF, and establishes a connection between the destination PCF and the destination AN; the destination PCF registers to the PDSN, and establishes a connection between the destination PCF and the PDSN.

B2'. After the connection between the destination PCF and the PDSN has been established, the PDSN sends a bi-cast indication message to the source AN to notify the source AN/PCF that the PDSN will send data to the destination PCF/AN and the source AN/PCF simultaneously.

Here, in step B2',
when the existed connection between the PCF and the PDSN is determined as an inter-AN handoff, the PDSN sends the bi-cast indication message.

Here, the data includes real-time service data and non-real-time service data.

Here, the method further includes that
in response to receiving the bi-cast Indication message, the source AN stops sending real-time service packets while continuing to send non-real-time service packets.

Here, the method further includes that
when the access terminal can receive data via the destination AN, the destination AN sends a handoff complete message to the source AN, and that
in response to receiving the handoff complete message, the source AN interchanges information with the source PCF, and releases the connection between the source PCF and the source AN.

Here, step B further includes the following step.
B3. The source AN sends a channel assignment message to the access terminal according to a handoff reply message sent from the destination AN, and interchanges information with the source PCF instructing to disconnect an air interface connection when receiving a reply from the access terminal, or, the source AN interchanges information with the source PCF instructing to disconnect the air interface connection directly after sending the channel assignment message without waiting for the replay from the access terminal.

Here, step B3 includes the following steps.
B31. The source AN sends the channel assignment message to the access terminal, the access terminal is handed off to the destination AN, and the destination AN allocates a Uni-cast Access Terminal Identifier (UATI) for the access terminal, so as to complete assignment of the UATI.

B32. The destination AN interchanges information with the destination PCF so as to establish an air interface connection of the destination AN.

Or,
B33. The source AN sends a UATI assignment message to the access terminal, and sends the traffic channel assignment message to the access terminal when the UATI assignment is completed, and completes the channel assignment.

B34. The destination AN interchanges information with the destination PCF so as to establish an air interface connection of the destination AN.

Here, step B includes that
for a handoff between Access Networks belonging to different PCFs, the PDSN sends data to be transmitted to the access terminal simultaneously to the source PCF to which the source AN belongs and the destination PCF to which the destination AN belongs.

Here, step B further includes that
the data to be transmitted to the access terminal is saved in the Base Transceiver Stations corresponding to the source AN and the destination AN respectively.

Here, the method further includes that when the handoff procedure from the source AN to the destination AN fails, the source AN and the source PCF send the access terminal the data to be transmitted to the access terminal.

The present invention further provides a system for implementing an inter-AN handoff in an active state in an HRPD network, including a source AN, a source PCF, a destination AN, and a destination PCF.

After the source AN initiates an inter-AN handoff procedure, the destination AN establishes a connection with a PDSN before an access terminal establishes a connection with the destination AN, and the PDSN sends user data to the destination AN/PCF.

After the access terminal has established the connection with the destination AN, the destination AN/PCF sends the data received from the PDSN to the access terminal.

Here, when the source PCF requests to stop sending data, the PDSN sends data to the destination PCF while stopping sending data to the source PCF.

Here, after the connection between the destination PCF and the PDSN has been established, the PDSN sends a bi-cast indication message to the source AN to notify the source AN/PCF that the PDSN will send data to the destination PCF/AN and the source AN/PCF simultaneously.

As can be seen from the technical solutions provided in the present invention, an inter-AN, inter-PCF hard handoff is achieved. During the procedure for such a hard handoff, the PDSN sends data to the destination PCF/AN in advance, so that the data may be sent from the destination PCF/AN to the access terminal immediately after a connection between the access terminal and the destination AN has been established. Accordingly, the continuity of a service may be improved, and the time delay and the packet loss due to a time delay may be reduced.

Furthermore, if the handoff fails, the data may be sent to the access terminal by the source PCF, so that the packet loss resulted from the failed handoff may be avoided.

Alternatively, after a connection between the destination PCF/AN and the PDSN has been established, the PDSN may send a concurrent indication message to the source PCF/AN, and sends data to the destination PCF and the source PCF simultaneously when receiving a reply from the source PCF/AN, then the destination PCF buffers the data in the handoff procedure. The source PCF also buffers the data after receiving a bi-cast indication message for a future return in the case of a handoff failure. Therefore, the reliability may be improved. The destination AN or PCF may send data to the access terminal immediately after the establishment of a connection between the access terminal and the destination AN.

DETAILED DESCRIPTION OF THE EMBODIMENTS

The essence of the present invention lies in that, respective data information is sent to a destination AN in advance during an inter-AN handoff. The data may be saved on the destination AN, or may be saved on a PCF to which the destination AN belongs, or may be saved on a Base Transceiver Station (BTS) to which the destination AN corresponds. Therefore, the continuity of a service after the handoff process ends may be ensured. Meanwhile, the data may be sent to a source AN/PCF, and saved at the source AMN/PCF, or saved on a Base Transceiver Station (BTS) to which the source AN corresponds. In this manner, the continuity of a service may be guaranteed whether the handoff is successful or not. Here, the access terminal may be a Mobile Station (MS) or the like.

Figure 1:
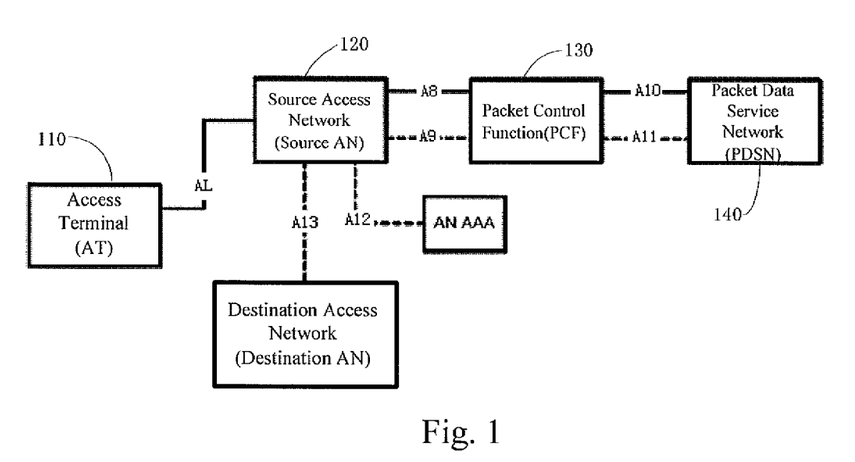
FIG. 1 is a schematic diagram illustrating the networking structure of an HRPD network according to the present invention.

The networking structure of an HRPD network is generally shown in FIG. 1. In the HRPD network, an Access Terminal (AT) 110 interworks with a source AN 120 through an air interface AL, the source AN 120 interworks with a PCF 130 via interfaces A8 and A9, the PCF 130 interworks with a PDSN 140 via interfaces A10 and A11. In this manner, the AT 110 may obtain the data traffic sent from the PDSN 140 via the source AN 120 and the PCF 130.

In the implementation, an method according to the present invention mainly includes the following:

When a destination AN establishes an A8 connection with a destination PCF and the destination PCF establishes an A10 connection with a PDSN (the A10 connection is a connection between a PCF and a PDSN) during an inter-PCF, inter-AN hard handoff process, the PDSN determines on its own accord whether to send a bi-cast indication message according as whether there exists an A10 connection.

During the inter-PCF handoff after the A8 and A10 have been established between the destination AN, the destination PCF and the PDSN, the PDSN sends data to both the source PCF and the destination PCF, so as to reduce the delay and packet loss of the destination AN/PCF. Further, the PDSN notifies the source PCF before sending data, and the destination AN/PCF may receive the subsequent data when receiving the notification. The source AN/PCF will not send the subsequently received data to the access terminal if the handoff is successful, and will continue to send the data that are not overtime only when the handoff fails.

Or, a method according to the present invention may include:

After sending a traffic channel assignment message to (or receiving a response to this message from) an access terminal, a source AN requests a PDSN to stop sending traffic data to a source PCF and send traffic data in advance to a destination PCF.

In the above process according to the present invention, the PDSN may decide according to the service options to send data to the destination PCF while sending data to the source PCF for a delay-sensitive service. In other words, if the requirement for delay is in accord with a predetermined requirement, after the A8 and A10 has been established between the destination AN, the destination PCF and the PDSN during an inter-PCF handoff.

Furthermore, in the method according to the present invention, the data received by the destination AN may be sent directly to a BTS in the destination AN for buffering, and the data received by the source AN may also be sent to a BTS in the source AN for buffering so as to reduce delay during an inter-AN handoff.

Upon receiving a channel assignment complete message or a UATI complete message from the access terminal, the destination AN sends data to the access terminal immediately.

Figure 2:
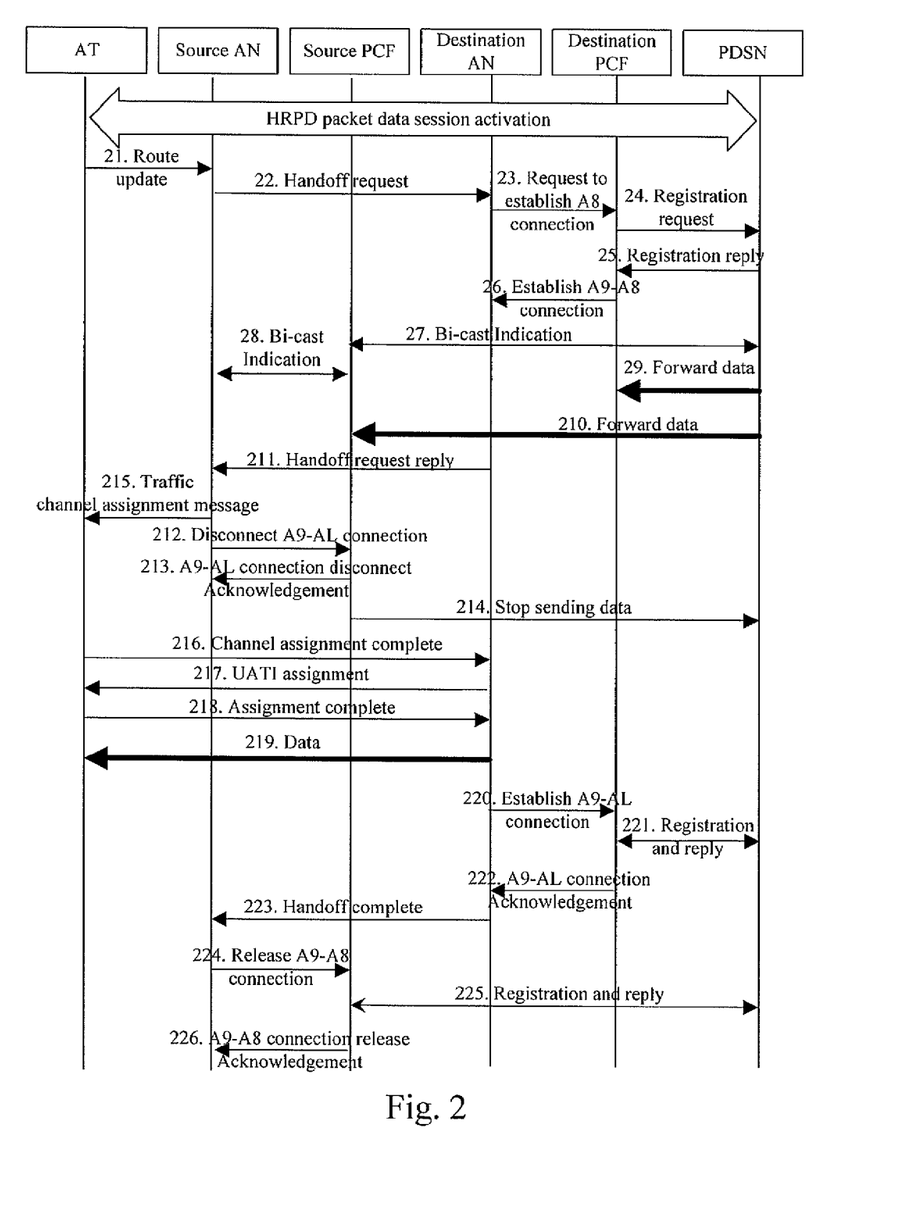
FIG. 2 is a flow chart illustrating an inter-PCF, inter-AN hard handoff in a method according to an embodiment of the present invention.

In the technical solution shown in FIG. 2, after sending the traffic channel assignment message to the access terminal, the source PCF may choose to send an Xoff (stop sending data) message to the PDSN requesting the PDSN to stop sending data so as to save the bandwidth (see step 214). Alternatively, the source PCF may choose not to send the Xoff message so as to facilitate the return in the case of a handoff failure.

With the method according to the present invention, the requirement of the transmission of a real-time service and a non-real-time service in a HRPD network could be met.

In an actual application, an embodiment of the present invention provides a process for an inter-AN hard handoff in the case of inter-PCF, i.e. a process for an inter-AN hard handoff between different PCFs, which will be described below.

A process for an Inter-AN/Inter-PCF hard handoff, i.e. an inter-AN hard handoff between different PCFs, is as shown in FIG. 2 which includes the following steps.

Step 21: An AT sends a source AN a route update message which contains the information of neighboring area in which the signal is stronger.

Step 22: The source AN determines that a hard handoff is necessary according to the route update message, and sends a destination AN a handoff request message which contains the information of a session related with the AT.

Step 23: On receiving the handoff request message, the destination AN verifies the message and authenticates the AT. If the verification is passed, the destination AN establishes an A8 connection with a destination PCF and starts a timer TA8-Setup. Here, an indication requesting the PDSN to send data to the destination PCF in advance may be added in the message for establishing the A8.

Step 24: On receiving an A9-Setup-A8 message, the destination PCF initiates an A10 connection establishment to the PDSN, i.e., sends a registration request message to the PDSN requesting the PDSN to send data to the destination PCF in advance. A new message may be added to send the indication.

Step 25: After the A10 connection has been established, the PDSN responds to the destination PCF by sending an A11 registration reply message, i.e. an A11-registration Reply message.

Step 26: After the A8 connection has been completed, the destination PCF feeds back an establishment of A9 and A8 interfaces connection message, i.e., an A9-Connect-A8 message, to the destination AN. The destination AN then stops the timer TA8-Setup.

Step 27: The PDSN sends a bi-cast Indication message to the source PCF indicating that the data will be sent by PDSN to the destination AN/PCF and the source AN/PCF at the same time.

Step 28: After receiving the bi-cast Indication message, the source PCF sends the bi-cast Indication message to the source AN notifying the source AN to continue to receive data from the source PCF. After receiving the bi-cast Indication message, the source AN needs to continue to sent the received non-real-time traffic data to the access terminal. As for the real-time traffic data, the source AN needs to send only the data which is received before the reception of the bi-cast Indication message to the access terminal. The source AN will not send the data which is received after the reception of the bi-cast Indication message to the access terminal unless the handoff fails.

In other words, after determining that the bi-cast Indication message has been received, for the data packets which are received after the reception of the bi-cast Indication message, the source AN will not send the real-time traffic data packets to the access terminal, but will continue to send the non-real-time traffic data packets to the access terminal.

In addition, in this step, a reply-to-PDSN mechanism may be chosen, and a reply mechanism may also be added between the PCF and AN, so as to ensure the reliability of the signaling transmission.

Step 29: After sending the bi-cast Indication message, the PDSN may decide whether to send forward data to the destination PCF according to the attributes of traffic, or may send forward data to the destination PCF uniformly regardless of the attributes of traffic. The destination PCF saves the received data and sends the received data to the access terminal immediately after the destination AN establishes a connection with the access terminal.

Step 210: After sending the bi-cast Indication message, the PDSN sends forward data to the source PCF at the same time. The data may be saved at the source PCF, or may be sent to the source AN and saved at the source AN.

Step 211: The destination AN sends the source AN a handoff request reply message which contains the parameters of the channel assigned to the destination AN and the like.

Step 215: After receiving the handoff request reply message, the source AN sends a channel assignment message over the traffic channel to the AT instructing the AT to perform a handoff to the destination AN.

Step 212: At the same time, the source AN sends the source PCF a message requesting the disconnection between the A9 and AL interfaces, i.e. an A9-AL-Disconnected message, instructing the source PCF to stop sending data to the source AN. In other words, the source AN will not wait a reply to the traffic channel assignment message, but directly sends the source PCF a message requesting the disconnection between the A9 and AL interfaces, i.e., an A9-AL-Disconnected message, instructing the source PCF to stop sending data to the source AN.

Or,

After receiving a reply to the traffic channel assignment message, the source AN sends the source PCF a message requesting the disconnection between the A9 and AL interfaces, i.e., an A9-AL-Disconnected message, instructing the source PCF to stop sending data to the source AN.

Step 213: In response to the message requesting the disconnection between the A9 and AL interfaces, the source PCF sends the source AN an acknowledge message, i.e., an A9-A1-Disconnected Ack message, and stops sending data to the source AN.

Step 214: The source PCF sends the PDSN an Xoff message, i.e., a stop sending data message, requesting the PDSN to stop sending data to the source PCF, and indicating the handoff has been performed.

This step is optional. If this message is sent, the communication resources of the A interface may be saved. If this message is not sent, it may be ensured not to loss data in the case of a failure of the handoff though the communication resources of the A interface may be occupied.

Step 216: When being handed off to the destination AN, the AT sends a channel assignment complete message to the destination AN.

Step 217: The destination AN sends a UATI assignment message to the AT over the traffic channel, to allocate a new UATI for the AT.

Step 218: Upon receipt, the AT sends a UATI complete message back to the destination AN over the traffic channel.

Step 219: After the handoff is successful, a session between the AT and the PDSN is activated, and the destination AN sends data to the AT.

This step may be executed at any moment after the execution of step 218, the sooner, the better.

Step 220: The destination AN sends an A9-AL Connected message indicating the channel has been activated.

Step 221: The destination PCF sends a registration message, i.e. an A11-Registration Request message, to the PDSN, indicating that the link has been activated, and the PDSN sends a registration reply back to the destination PCF.

If step 214 is not executed or the Xoff message is lost, the PDSN will stop sending data to the source AN/PCF at this moment.

Step 222: The destination PCF sends back an acknowledge message of the connection between the A9 and the AL, i.e. an A9-AL-Connected Ack message, to the destination AN.

Step 223: The destination AN sends a handoff complete message to the source AN.

Step 224: After receiving the handoff complete message, the source AN sends an A9-Release-A8 message to the source PCF notifying the source PCF to release the connection between the A9 and A8 interfaces. At the same time, a timer TArel9 is started, and the A8 link is released at the source AN.

Step 225: After receiving the A9-Release-A8 message from the source AN, the source PCF sends an A11-Registration Request message to the PDSN to release the A10 connection. After releasing the A10 connection, the PDSN sends back an A11-Registration Reply message to the source PCF, and the source PCF releases the resources of the A10 connection.

Step 226: The source CF releases the resources of the A8 connection, and sends the source AN an A9-Release-A8 Complete message (indicating that the connection between the A9 and A8 has been released), and the source AN will stop the timer TArel9 on receiving the message.

Steps 215, 216, 217 and 218 described above with reference to FIG. 2 may alternatively be implemented by the following steps.

After step 211 described above, step 215' may be executed.

Step 215': The source AN sends a UATI assignment message to the AT over the traffic channel to allocate a new UATI to the AT. This new UATI is allocated by the destination AN, and may be carried to the source AN via a handoff request reply message.

Step 216': The AT sends a UATI complete message back to the source AN over the traffic channel.

Step 217': The source AN sends a channel assignment message to the AT over the traffic channel, so as to perform the handoff to the destination AN.

The step 212 may be executed directly subsequent to step 217', or may be executed after receiving a channel assignment reply message returned from the AT.

After step 214, step 218' will be executed.

Step 218': After being handed off to the destination AN, the AT sends a channel assignment complete message to the destination AN over the access channel.

In an actual application, the above two processes may be chosen as required.

Figure 3:
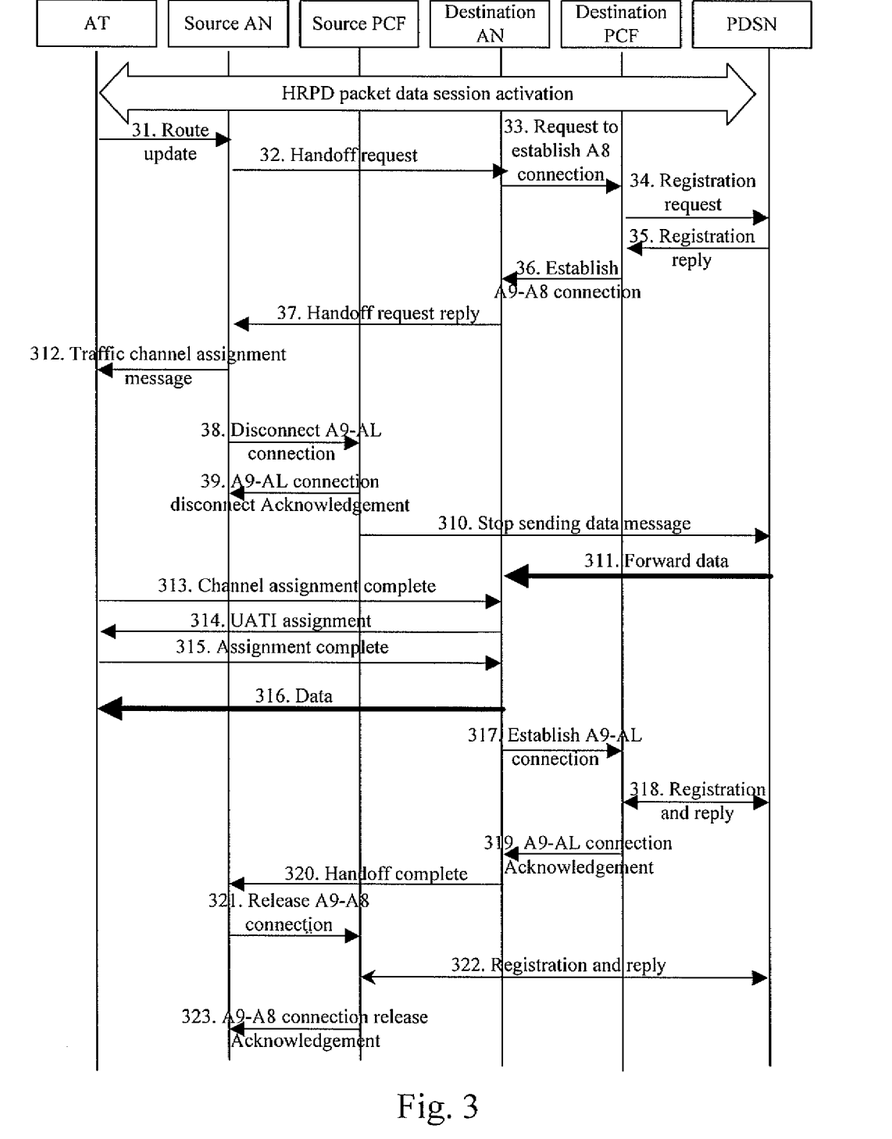
FIG. 3 is a flow chart illustrating an inter-PCF, inter-AN hard handoff in a method according to another embodiment of the present invention.

The present invention provides another process for an Inter-AN/Inter-PCF hard handoff as shown in FIG. 3 which includes the following steps.

Step 31: An AT sends a source AN a route update message which contains the information of neighboring area in which the signal is stronger.

Step 32: The source AN determines that a hard handoff is necessary according to the route update message, and sends a destination AN a handoff request message which contains the information of a session related with the AT.

Step 33: On receiving the handoff request message, the destination AN verifies the message and authenticates the AT. If the verification is passed, the destination AN establishes an A8 connection with a destination PCF and starts a timer TA8-Setup.

Step 34: On receiving an A9-Setup-A8 message, the destination PCF initiates an A10 connection establishment to the PDSN, in other words, sends a registration message to the PDSN.

Step 35: After the A10 connection has been established, the PDSN responds to the destination PCF by sending an A11-registration Reply message.

Step 36: After the A8 connection is completed, the destination PCF feeds back an A9-Connect-A8 message to the destination AN. The destination AN then stops the timer TA8-Setup.

Step 37: The destination AN sends the source AN a handoff request reply message which contains the parameters of the channel assigned to the destination AN and the like.

After receiving the handoff request reply message, the source AN executes step 312 to assign the traffic channel. At the same time, step 38 is executed to release the connection between the A9 and AL. Of course, step 38 may also be executed after receiving a channel assignment reply message returned from the AT.

Step 38: The source AN sends an A9-AL-Disconnected message (disconnect the connection between the A9 and AL) to the source PCF, notifying the source PCF to stop sending data to the source AN.

Step 39: The source PCF returns an A9-AL-Disconnected Ack (acknowledging the disconnection between the A9 and AL) message to the source AN, and stops sending data to the source AN.

Step 310: The source PCF sends the PDSN an Xoff message, i.e., a stop sending data message, requesting the PDSN to stop sending data to the source PCF, and indicating the handoff has been performed.

Step 311: After receiving the message, the PDSN stops sending data to the source AN, and sends data to the destination PCF, wherein the data may be sent to the destination AN.

Step 312: The source AN sends a channel assignment message to the AT over the traffic channel, instructing the AT to be handed off to the destination AN.

The AT may return a reply of this message to the source AN to confirm the completion of the assignment. However, this operation of returning a reply by the AT is optional, and is not a necessary step.

Step 313: When being handed off to the destination AN, the AT sends a channel assignment complete message to the destination AN over the access channel.

Step 314: The destination AN sends an UATI assignment message to the AT over the access channel, to allocate a new UATI for the AT.

Step 315: Upon receipt, the AT sends an UATI complete message back to the destination AN over the traffic channel.

Step 316: After the handoff is successful, a session between the AT such as a mobile terminal (MS) and the PDSN is activated. That is, the access terminal may receive data via the destination AN.

This step may be executed at any moment after the execution of step 314, the sooner, the better.

Step 317: The destination AN sends the destination PCF a message to establish a connection between the A9 and AL interfaces, i.e., an A9-AL Connected message indicating the channel has been activated.

Step 318: The destination PCF sends an A11-Registration Request message to the PDSN, indicating the link has been activated, and the PDSN sends a registration reply message back to the destination PCF.

Step 319: The destination PCF sends back an A9-AL-Connected Ack message (an acknowledgment to the A9-AL connection) to the destination AN.

Step 320: The destination AN sends a handoff complete message to the source AN.

Step 321: After receiving the handoff complete message, the source AN sends an A9-Release-A8 message (releasing the connection between the A9 and A8) to the source PCF, and starts a timer TArel9 locally, and releases the A8 link.

Step 322: After receiving the A9-Release-A8 message from the source AN, the source PCF sends an A11-Registration Request message to the PDSN requesting to release the A10 connection. After releasing the A10 connection, the PDSN sends back an A11-Registration Reply message to the source PCF, and the source PCF releases the resources of the A10 connection.

Step 323: After releasing the resources of the A8 connection, the source PCF sends the source AN an A9-Release-A8 Complete message (indicating that the connection between the and A8 has been released), and the source AN stops the timer TArel9. Steps 312, 313, 314 and 315 described above with reference to FIG. 3 may alternatively be implemented by the following steps.

After step 37 described above, step 312' may be executed.

Step 312': The source AN sends an UATI assignment message to the AT over the traffic channel to allocate a new UATI to the AT. This new UATI is allocated by the destination AN, and may be carried to the source AN via a handoff request reply message.

Step 313': The AT sends an UATI assignment complete message back to the source AN over the traffic channel.

Step 314': The source AN sends a channel assignment message to the AT over the traffic channel, so as to perform the handoff to the destination AN.

Step 38 may be executed directly subsequent to step 314', or may be executed after receiving a channel assignment reply message returned from the AT.

After step 38, step 315' will be executed.

Step 315': After being handed off to the destination AN, the AT sends a channel assignment complete message to the destination AN over the access channel.

In an actual application, the above two processes may be chosen as required.

The steps shown in FIG. 2 and FIG. 3 should not be limited to the exact order for execution described above, and some of the steps may be executed at a time according to actual requirement. For example, step 222 in FIG. 2 and step 319 in FIG. 3 need only to be executed after the channel and UATI assignment for the AT has been completed, and are not limited to be executed after the connection between A9 and AL is established. For another example, the channel and UATI assignment as shown in FIG. 2 and FIG. 3 may be executed at any time after acknowledging that a connection between the destination AN and PDSN has been established, and is not necessarily limited to the processing order as shown in FIG. 2 and FIG. 3.

In summary, with the method according to the embodiments of the present invention, an inter-PCF, inter-AN hard handoff may be implemented, and a handoff mechanism in an HRPD network with less packet loss and higher reliability is provided.

Further, as can be seen from the above description of the method according to the embodiments of the present invention, a system for an inter-AN handoff in an active state in an HRPD network is also provided. The system includes a source AN, a source PCF, a destination AN, a destination PCF and a PDSN. After the source AN initiates an inter-AN handoff, and before the access terminal establishes a connection with the destination AN, the destination AN establishes a connection with the PDSN, and the PDSN sends user data to the destination AN/PCF. When the access terminal establishes a connection with the destination AN, the destination AN/PCF sends the data received from the PDSN to the access terminal.

Here, the PDSN sends data to the destination PCF and stops sending data to the source PCF when the source PCF requests the PSDN to stop sending data. Or, after the connection between the destination PCF and the PDSN has been established, the PDSN sends a bi-cast Indication message to the source AN notifying the source AN/PCF that the PDSN will send data to the destination PCF/AN and the source AN/PCF at the same time.

The present invention has been described and illustrated by the embodiments of the present invention and the drawings. It shall be recognized by those skilled in the art that those embodiments and drawings are merely illustrative and not restrictive, that the present invention shall not be limited to those embodiments and drawings and that various modifications and variations can be made to the embodiments of the present invention in light of the descriptions and the drawings without departing from the spirit and scope of the present invention as defined by the accompanying claims.

What is claimed is:

1. A system for implementing an inter-Access Network (AN) handoff in an active state in a High Rate Packet Data (HRPD) network, comprising:

a source AN; and a destination AN;

wherein the source AN is configured to determine that an access terminal needs to handoff from the source AN to the destination AN, and to initiate a handoff to the destination AN; and wherein the destination AN is configured to initiate a connection establishment between the destination AN and a Packet Data Service Network (PDSN) before the access terminal establishes a connection with the destination AN, so as to send, by the PDSN, data to the destination AN, and to send the data received from the PDSN to the access terminal after the access terminal has established the connection with the destination AN.

2. The system according to claim 1, the source AN comprises:

a first unit, configured to determine that the access terminal need to handoff from the source AN to the destination AN according to a received route update message from the access terminal; and a second unit, configured to send a handoff request message to the destination AN.

* * * * *